United States Patent
Bi et al.

(10) Patent No.: US 11,387,492 B2
(45) Date of Patent: Jul. 12, 2022

(54) RECHARGEABLE NON-AQUEOUS SODIUM-AIR BATTERIES

(71) Applicant: UChicago Argonne, LLC, Chicago, IL (US)

(72) Inventors: Xuanxuan Bi, Naperville, IL (US); Jun Lu, Naperville, IL (US); Khalil Amine, Oakbrook, IL (US)

(73) Assignee: UChicago Argonne, LLC, Chicago, IL (US)

( * ) Notice: Subject to any disclaimer, the term of this patent is extended or adjusted under 35 U.S.C. 154(b) by 165 days.

(21) Appl. No.: 16/506,302

(22) Filed: Jul. 9, 2019

(65) Prior Publication Data

US 2021/0013547 A1    Jan. 14, 2021

(51) Int. Cl.
| | |
|---|---|
| *H01M 10/0569* | (2010.01) |
| *H01M 4/86* | (2006.01) |
| *H01M 12/08* | (2006.01) |
| *H01M 50/46* | (2021.01) |

(52) U.S. Cl.
CPC ..... *H01M 10/0569* (2013.01); *H01M 4/8668* (2013.01); *H01M 12/08* (2013.01); *H01M 50/46* (2021.01)

(58) Field of Classification Search
CPC . H01M 10/05–0569; H01M 50/40–46; H01M 4/86–8668; H01M 12/08
See application file for complete search history.

(56) References Cited

U.S. PATENT DOCUMENTS

| | | | |
|---|---|---|---|
| 2015/0099196 A1* | 4/2015 | Garsuch | H01M 8/02 429/405 |
| 2018/0342776 A1 | 11/2018 | Kim et al. | |

OTHER PUBLICATIONS

"Rongyue Wang, Sodium Peroxide Dihydrate or Sodium Superoxide: The Importance of the Cell Configuration for Sodium-Oxygen Batteries, May 2017, Small Methods, pp. 1-6" (Year: 2017).*

* cited by examiner

*Primary Examiner* — Cynthia H Kelly
*Assistant Examiner* — Niara Trant
(74) *Attorney, Agent, or Firm* — Foley & Lardner LLP

(57) ABSTRACT

An electrochemical device includes an air cathode using air as the cathodic gas; a discharge product of sodium peroxide dihydrate; an anode comprising sodium metal; a porous fiber separator; and a non-aqueous electrolyte comprising a sodium salt and a solvent.

17 Claims, 8 Drawing Sheets

FIG. 5A
FIG. 5B
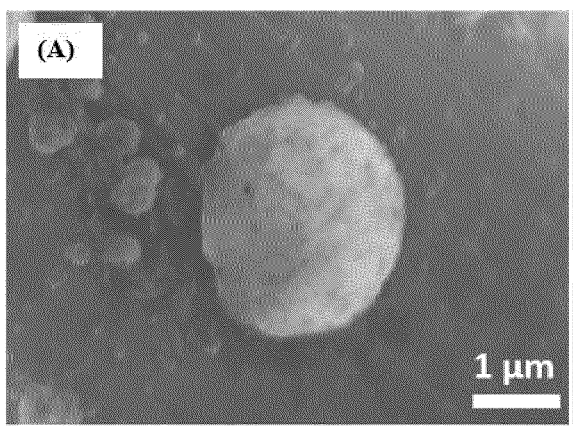
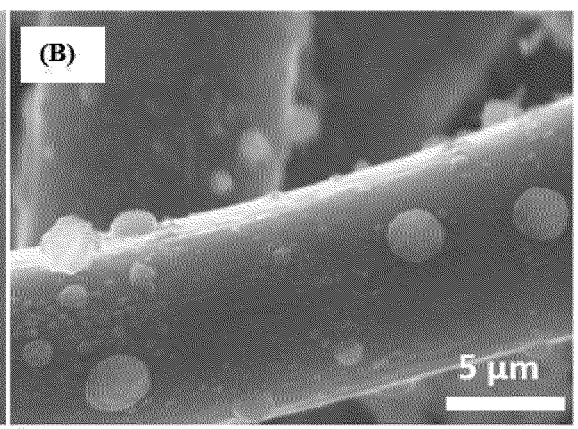
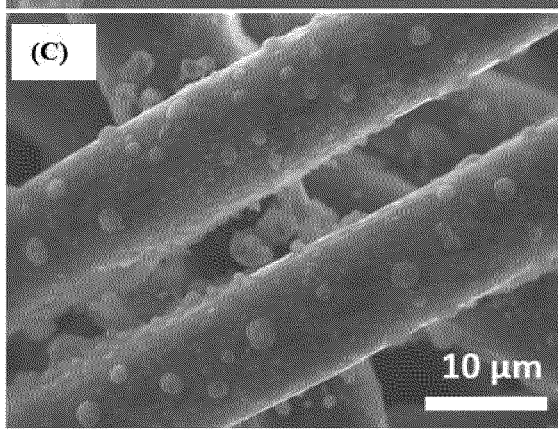
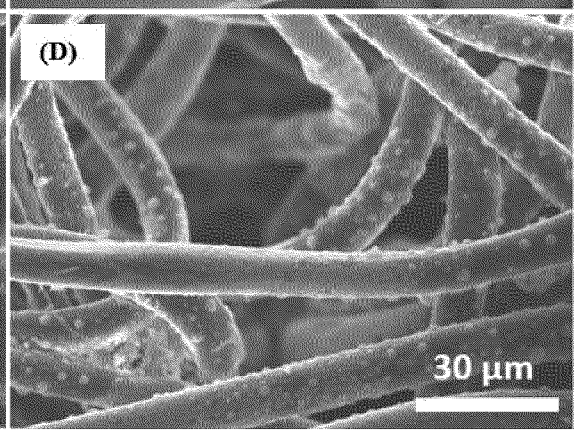
FIG. 5C
FIG. 5D

RECHARGEABLE NON-AQUEOUS SODIUM-AIR BATTERIES

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to electroactive materials and batteries containing such electroactive materials, and methods to prepare the electroactive materials and batteries containing the same. More specifically, the present technology is related to sodium-air batteries.

BACKGROUND

Rechargeable sodium-air batteries have attracted extensive research interests due to their high specific capacity, high energy density, and sufficient storage of sodium sources. Previous studies on sodium-air batteries have focused primarily on two classes of battery: non-aqueous (1) and aqueous (2) systems. In the non-aqueous systems, the electrolyte is non-aqueous and the cell is made airtight with pure oxygen admitted to the cell as the cathodic source. Alternatively, in the aqueous systems, the cathode is open to air and an aqueous electrolyte is used. To prevent exothermic and explosive reactions between the alkali metal anode and water in the aqueous systems, a sodium-ion selective solid-state membrane is included within in the aqueous cell.

Configuring sodium-air batteries to work under real-world conditions, in an air atmosphere, is one of the ultimate goals and challenges for their practical application. In non-aqueous systems, sodium superoxide ($NaO_2$) and sodium peroxide dihydrate ($Na_2O_2 \cdot 2H_2O$) were discovered as two major discharge products. With oxygen as the only reactive source in the cathode, side reactions between the discharge product and other active gas components in the air are eliminated. Thus, the non-aqueous sodium-air batteries exhibit high stability, high round trip efficiency, and high cyclability.

In aqueous systems, a challenge arises from the solid-state membrane, which serves as a barrier between the metal anode and the air electrode. Such membranes have high manufacturing costs, low sodium-ion permeability, and poor electrochemical stability. Sodium dendrite formation during cycling may lead to membrane breakage and inducement of severe reactions between water and alkali metal, leading to safety concerns. Another challenge is the reversibility of the discharge product depending on the aqueous solution, which determines the energy efficiency of the cell. Sodium hydroxide is the major discharge product in aqueous sodium-air batteries, and the charge of the product is high energy, resulting in a low round-trip efficiency.

There is a need for efficient sodium-air batteries which operate under an air atmosphere. This disclosure satisfies this need.

SUMMARY

In one aspect, an electrochemical device is provided including an air cathode including air; an anode including a metal; a discharge product including sodium peroxide dihydrate ($Na_2O_2 \cdot 2H_2O$); a porous separator; and a non-aqueous electrolyte including a sodium salt and a solvent.

In some embodiments, the air cathode includes an air cathode layer including an electroconductive material and the air. In some embodiments, the air includes $N_2$, $O_2$, $H_2$, $CO_2$, Ar, and/or water.

In some embodiments, the electroconductive material includes a porous carbon material selected from one or more of synthetic graphite, natural graphite, expanded graphite, graphene, reduced graphene oxide, a metal-organic framework, amorphous carbon, hard carbon, soft carbon, carbon black, acetylene black, carbon spheres, mesocarbon microbeads (MCMB), mesoporous carbon, porous carbon matrix, carbon nanofiber, carbon aerogel, single-walled carbon nanotubes, multi-walled carbon nanotubes, and carbon nanotube arrays.

In some embodiments, the electrochemical device includes a sodium-air secondary battery.

In some embodiments, the air cathode includes a catalyst. In some embodiments, the catalyst includes carbon, a noble metal, Pt, Pd, Au, Ru, Ir, Ag, PtNi, PtAu, PtCu, PtRu, PtPd, metal oxides, $MnO_2$, NiO, $Co_3O_4$, $CeO_2$, $V_2O_5$, $Fe_2O_3$, ZnO, CuO, $NaMnO_2$, redox mediators, or a combination of any two or more thereof.

In some embodiments, the air cathode further includes a current collector, a conductive carbon material, a binder, or any combination thereof. In some embodiments, the air cathode includes a binder. In some embodiments, the binder includes polyaniline, polypyrrole, poly(pyrrole-co-aniline), polyphenylene, polythiophene, polyacetylene, polysiloxane, polyvinylidene difluoride (PVDF), polyfluorene, polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), alginate, gelatine, a copolymer of any two or more thereof, or a blend of any two or more thereof.

In some embodiments, the anode includes one or more of sodium, sodiated carbon, sodiated tin, sodiated silicon, sodiated antimony, sodium lithium alloy, and sodium titanium oxide.

In some embodiments, the sodium-air battery includes a non-aqueous electrolyte including a sodium salt and a solvent.

In some embodiments, the sodium salt includes $Na[CF_3CO_2]$; $Na[C_2F_5CO_2]$; $NaClO_4$; $NaBF_4$; $NaAsF_6$; $NaPF_6$; $Na[PF_2(C_2O_4)_2]$; $Na[PF_4(C_2O_4)]$; $Na[CF_3SO_3]$; $Na[CH_3SO_3]$; $Na[N(SO_2F)_2]$; $Na[N(SO_2CF_3)_2]$; $Na[C(CF_3SO_2)_3]$; $Na[N(SO_2C_2F_5)_2]$; $NaSiF_6$; $NaSbF_6$; $NaAlCl_4$; $NaNO_3$; $Na_2SO_4$; NaOH; a sodium alkyl fluorophosphate; a sodium alkyl fluoroborate; sodium 4,5-dicyano-2-(trifluoromethyl)imidazole; sodium 4,5-dicyano-2-methylimidazole; trisodium 2,2',2"-tris(trifluoromethyl)benzotris (imidazolate); $Na[B(C_2O_4)_2]$; $Na[BF_2(C_2O_4)_2]$; $Na_2[(B_{12}X_{12-n}H_n)]$; $Na_2[(B_{10}X_{10-n'}H_{n'})]$; or a mixture of any two or more thereof, wherein X is independently at each occurrence a halogen, n, is an integer from 0 to 12 and n' is an integer from 0 to 10.

In some embodiments, the electrolyte includes a liquid including the sodium salt at a concentration of about 0.1 M to about 5.0 M. In some embodiments, the solvent includes an ether solvent selected from the group consisting of dimethoxyethane (DME), diethylene glycol dimethyl ether (DEGDME), triethylene glycol dimethyl ether, tetraethylene glycol dimethyl ether (TEGDME), carbonates such as ethylene carbonate (EC), dimethylcarbonate (DMC), diethylcarbonate (DEC), propylene carbonate (PC), other solvents such as dioloxane, γ-butyrolactone, δ-butyrolactone, N-alkylpyrrolidone, fluoroethers (including perfluorinated ethers), fluoro esters (including perfluorinated esters), fluoroethylene carbonate, adiponitrile; (ethylene glycol)methylenetrimethyl silane (1NM1), di(ethylene glycol)methylenetrimethyl silane (1NM2), tri(ethylene glycol) methylenetrimethyl silane (1NM3), acetonitrile (ACN), dimethyl sulfoxide (DMSO), dimethylformamide (DMF), siloxanes, triethyl phosphate, N,N-dimethylacetamide, N-methylpyrrolidone, methoxybenzene, solid electrolytes such as $Na_3PS_4$ inorganic solid electrolyte, β-Alumina electrolyte, NASICON based solid electrolyte of $NaMP_3O_{12}$ (wherein M is a divalent cation, a trivalent cation, a tetravalent cation, or a pentavalent cation), gel electrolytes, polyethylene oxide (PEO), polyacrylonitride (PAN), polymethylmethacrylate (PMMA), and combinations thereof. In some embodiments, the divalent cation is $Cd^{2+}$, $Mn^{2+}$, $Co^{2+}$, $Ni^{2+}$, or $Zn^{2+}$; the trivalent cation is $Al^{3+}$, $Ga^{3+}$, or $Y^{3+}$; the tetravalent cation is $Ti^{4+}$, $Si^{4+}$, or $Zr^{4+}$; and the pentavalent cation is $V^{5+}$, $Nb^{5+}$, or $Sb^{5+}$.

In some embodiments, the porous separator includes a glass fiber material, a carbon fiber material, polyethylene, polypropylene/polyethylene/polypropylene, solid state membranes, or a combination of any two or more thereof.

In another aspect, a process of discharging a sodium-air battery is provided, the process including discharging a sodium-air battery to form at a discharged sodium-air battery including an air cathode including a discharge product of sodium peroxide dihydrate ($Na_2O_2.2H_2O$).

In some embodiments, the discharge product is formed by the chemical reaction: $2Na+O_2+2H_2O \leftrightarrow Na_2O_2.2H_2O$.

In some embodiments, the reaction is catalyzed. In some embodiments, the reaction is catalyzed by a catalyst selected from the group consisting of carbon, a noble metal, Pt, Pd, Au, Ru, Ir, Ag, PtNi, PtAu, PtCu, PtRu, PtPd, metal oxides, $MnO_2$, NiO, $Co_3O_4$, $CeO_2$, $V_2O_5$, $Fe_2O_3$, ZnO, CuO, $NaMnO_2$, redox mediators, and a combination of any two or more thereof.

In some embodiments, the discharging is conducted under an air atmosphere including $N_2$, $O_2$, $H_2$, $CO_2$, Ar, and/or water.

In some embodiments, the discharged sodium-air battery includes an anode including a metal and an air cathode including an air cathode layer including an electroconductive material and the air.

In some embodiments, the process further includes applying a potential to the discharged sodium-air battery to reverse the formation of sodium peroxide dihydrate. In some embodiments, the sodium peroxide dihydrate is reversibly formed.

In some embodiments of the process, the electrochemical device is discharged to about 2.4 V to about 1.6 V.

In some embodiments of the process, the electrochemical device is discharged at a current density of about 10 μA to about 2000 μA.

In some embodiments of the process, the electroconductive material includes a porous carbon material selected from one or more of synthetic graphite, natural graphite, expanded graphite, graphene, reduced graphene oxide, a metal-organic framework, amorphous carbon, hard carbon, soft carbon, carbon black, acetylene black, carbon spheres, mesocarbon microbeads (MCMB), mesoporous carbon, porous carbon matrix, carbon nanofiber, carbon aerogel, single-walled carbon nanotubes, multi-walled carbon nanotubes, and carbon nanotube arrays.

In some of the process, the sodium-air battery is a secondary battery.

In some embodiments of the process, the air cathode further includes a current collector, a conductive carbon material, a binder, or any combination thereof.

In some embodiments of the process, the binder includes polyaniline, polypyrrole, poly(pyrrole-co-aniline), polyphenylene, polythiophene, polyacetylene, polysiloxane, polyvinylidene difluoride (PVDF), polyfluorene, polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), alginate, gelatine, a copolymer of any two or more thereof, or a blend of any two or more thereof.

In some embodiments of the process, the anode includes one or more of sodium, sodiated carbon, sodiated tin, sodiated silicon, sodiated antimony, sodium lithium alloy, and sodium titanium oxide.

In some embodiments of the process, the sodium-air battery includes a non-aqueous electrolyte including a sodium salt and a solvent.

In some embodiments of the process, the sodium salt includes $Na[CF_3CO_2]$; $Na[C_2F_5CO_2]$; $NaClO_4$; $NaBF_4$; $NaAsF_6$; $NaPF_6$; $Na[PF_2(C_2O_4)_2]$; $Na[PF_4(C_2O_4)]$; $Na[CF_3SO_3]$; $Na[CH_3SO_3]$; $Na[N(SO_2F)_2]$; $Na[N(SO_2CF_3)_2]$; $Na[C(CF_3SO_2)_3]$; $Na[N(SO_2C_2F_5)_2]$; $NaSiF_6$; $NaSbF_6$; $NaAlCl_4$; $NaNO_3$; $Na_2SO_4$; a sodium alkyl fluorophosphate; a sodium alkyl fluoroborate; sodium 4,5-dicyano-2-(trifluoromethyl)imidazole; sodium 4,5-dicyano-2-methylimidazole; trisodium 2,2',2"-tris(trifluoromethyl) benzotris (imidazolate); $Na[B(C_2O_4)_2]$; $Na[BF_2(C_2O_4)_2]$; $Na_2[(B_{12}X_{12-n}H_n)]$; $Na_2[(B_{10}X_{10-n'}H_{n'})]$; or a mixture of any two or more thereof, wherein X is independently at each occurrence a halogen, n, is an integer from 0 to 12 and n' is an integer from 0 to 10.

In some embodiments of the process, the non-aqueous electrolyte includes a sodium salt at a concentration of about 0.1 M to about 5.0 M.

In some embodiments of the process, the solvent includes an ether solvent selected from the group consisting of dimethoxyethane (DME), diethylene glycol dimethyl ether (DEGDME), triethylene glycol dimethyl ether, tetraethylene glycol dimethyl ether (TEGDME), solid electrolytes such as $Na_3PS_4$ inorganic solid electrolyte, β-Alumina electrolyte, NASICON based solid electrolyte of $NaMP_3O_{12}$, wherein M is a divalent cation, a trivalent cation, a tetravalent cation, a pentavalent cation, gel electrolytes, polyethylene oxide (PEO), polyacrylonitride (PAN), polymethylmethacrylate (PMMA), and combinations thereof.

In any of the above embodiments, the divalent cation is $Cd^{2+}$, $Mn^{2+}$, $Co^{2+}$, $Ni^{2+}$, or $Zn^{2+}$; the trivalent cation is $Al^{3+}$, $Ga^{3+}$, or $Y^{3+}$; the tetravalent cation is $Ti^{4+}$, $Si^{4+}$, or $Zr^{4+}$; and the pentavalent cation is $V^{5+}$, $Nb^{5+}$, or $Sb^{5+}$.

In any of these above embodiments, the sodium-air battery may include a separator that is a glass fiber material, a carbon fiber material, polyethylene, polypropylene/polyethylene/polypropylene, solid state membranes, or a combination of any two or more thereof.

BRIEF DESCRIPTION OF THE DRAWINGS

FIGS. 5A-5D are scanning electron microscope (SEM) images of a discharged air electrode from a sodium-air battery without a catalyst.

DETAILED DESCRIPTION

Figure 1:
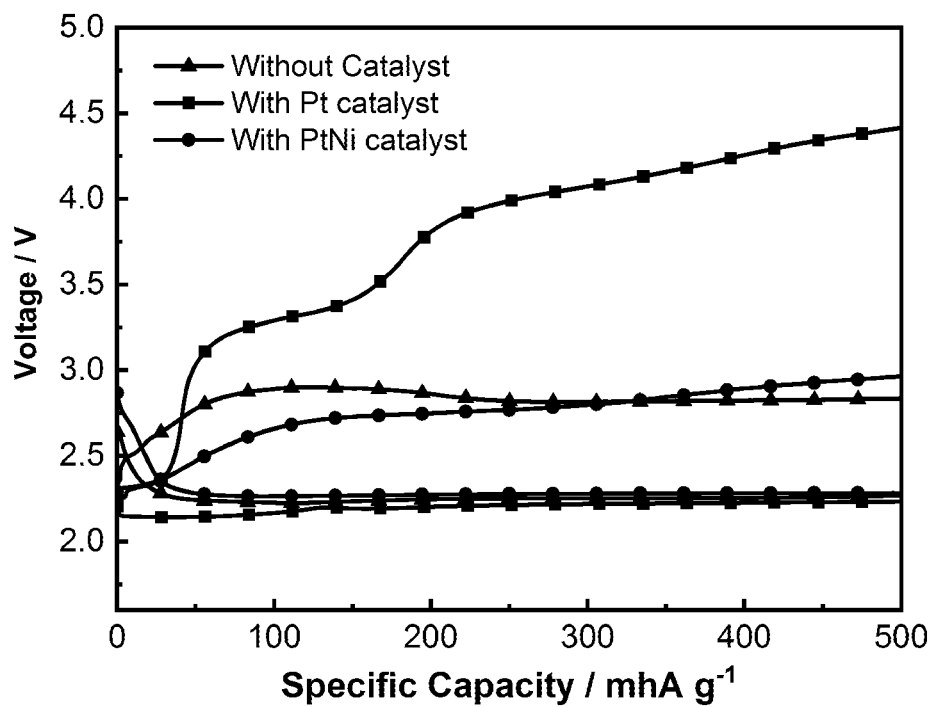
FIG. 1 is a voltage profile for sodium-air batteries without a catalyst, with a Pt/C catalyst, and with a PtNi/C catalyst, according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The formation of sodium peroxide dihydrate ($Na_2O_2 \cdot 2H_2O$) has been observed in sodium-air batteries when ultra-high purity oxygen environment from within the battery is leaking, or when the sodium oxygen cell stops operation, $NaO_2$ reacts with the electrolyte to form $Na_2O_2 \cdot 2H_2O$. For example, $NaO_2$ may react with water via the reaction: $2NaO_2 + 2H_2O \rightarrow Na_2O_2 \cdot 2H_2O + O_2$. For example, U.S. Patent Publication No. 2018/0342776 describes $Na_2O_2 \cdot 2H_2O$ as a by-product in the cell, the $Na_2O_2 \cdot 2H_2O$ being persistent (i.e. not reversible) and not being formed during discharge. In contrast, it has now been found that a reversible sodium-air battery, based on the formation/decomposition of $Na_2O_2 \cdot 2H_2O$, may be prepared and operated using an air atmosphere as the cathode reagent, providing improved stability and longer cycle life over previous batteries.

Accordingly, provided herein are rechargeable non-aqueous sodium ion based electrochemical cells that are able to cycle in an air atmosphere, while providing acceptable stability and cycle life. The electrochemical cells include a metal anode (optionally with a sodium source), a porous fiber separator (also serving as a protective layer for the metal anode), a porous air-cathode, and a non-aqueous electrolyte. In the configuration described in the Examples, the cells are configured to cycle for at least 80 cycles, with $Na_2O_2 \cdot xH_2O$ and/or y $NaOH \cdot H_2O_2$, where x is 1 or 2 and y is 1, as the primary discharge product. In some embodiments, the primary discharge product is $Na_2O_2 \cdot 2H_2O$. With the utilization of a catalyst, the charge potential is reduced from over 4 V to below 3 V, thus improving the energy efficiency of the cells.

As noted above, the sodium-air batteries described herein include an anode containing sodium. In some embodiments, the sodium may be in the form of $Na^0$, a sodium ($Na^0$)-carbon composite, a Na/Sb alloy, a Na/Sn alloy, a sodium metal oxide, or a $Na^0$ intercalated material. In some embodiments, the anode includes $Na^0$. In other embodiments, the anode includes $Na^0$ or a sodium ($Na^0$)-carbon composite. In some embodiments, the anode includes one or more of sodium, sodiated carbon, sodiated tin, sodiated silicon, sodiated antimony, sodium lithium alloy, and sodium titanium oxide.

The air-cathodes disclosed herein use oxygen and/or water from the atmosphere (air) as reagents during discharge. The air-cathodes may include an electroconductive material, for example, carbon. The carbon material in the air cathode is a porous structure that is a substrate for the discharge product(s) and allows for the flow of gas into the cell. Illustrative materials for the substrate include carbon, metals, or other conductive, and inert substances. In some embodiments, the air cathode includes an "air cathode layer" including the electroconductive material and the air.

In some embodiments, the porous carbon material is selected from one or more of synthetic graphite, natural graphite, expanded graphite, graphene, reduced graphene oxide, a metal-organic framework, amorphous carbon, hard carbon, soft carbon, carbon black, acetylene black, carbon spheres, mesocarbon microbeads (MCMB), mesoporous carbon, porous carbon matrix, carbon nanofiber, carbon aerogel, single-walled carbon nanotubes, multi-walled carbon nanotubes, and carbon nanotube arrays.

In one aspect, an electrochemical device is provided herein, the device including an air-cathode, an anode including sodium metal, a porous separator, and a non-aqueous electrolyte including a sodium salt and a solvent. In the devices, the porous separator includes a glass fiber material, polyethylene, polypropylene/polyethylene/polypropylene, Nafion membrane, a solid electrolyte disclosed herein, or a combination of any two or more thereof. In some embodiments, the porous separator is a porous fiber separator and includes a glass fiber material, a carbon fiber material, or a combination of any two or more thereof.

The air-cathodes may, in some instances, include a catalyst to facilitate the kinetics of the electrolyte chemical reaction (e.g. $2Na + O_2 + 2H_2O \leftrightarrow Na_2O_2 \cdot 2H_2O$. In some embodiments, the catalyst facilitates the forward reaction $2Na + O_2 + 2H_2O \rightarrow Na_2O_2 \cdot 2H_2O$. In some embodiments, the catalyst facilitates the reverse reaction $Na_2O_2 \cdot 2H_2O \rightarrow 2Na + O_2 + 2H_2O$. For example, the catalyst may be based on Pt, Pd, Au, Ru, Ir, Ag, PtNi, PtAu, PtCu, PtRu, PtPd, $MnO_2$, NiO, $Co_3O_4$, $CeO_2$, $V_2O_5$, $Fe_2O_3$, ZnO, CuO, $NaMnO_2$, redox mediators, or a combination of any two or more thereof. In some embodiments, the catalyst includes Pt, Ni, or a mixture thereof. In some embodiments, the catalyst includes PtNi/C.

In some embodiments, the air cathode may also include a current collector, a conductive carbon material, a binder, or any combination thereof.

The current collector for the anode or cathode may be prepared from a wide variety of electroactive materials. For example, illustrative current collectors include, but are not limited to; copper; stainless steel; titanium; tantalum; platinum; palladium; gold; silver; iron; aluminum; nickel; rhodium; manganese; vanadium; titanium; tungsten; cobalt nickel alloy; highly alloyed ferritic stainless steel containing molybdenum and chromium; or nickel-, chromium-, or molybdenum-containing alloys; or a carbon-coated metal described above. The current collector may take the form of a foil, mesh, or screen. In some embodiments, the electroactive material disclosed herein and one or more of an electroconductive carbon material and a binder are contacted with the current collector by casting, pressing, or rolling the mixture thereto. In some embodiments, the current collector is copper, stainless steel, titanium, tantalum, platinum, gold, aluminum, nickel, cobalt, cobalt nickel alloy, highly alloyed ferritic stainless steel containing molybdenum and chromium, a nickel-containing alloy, a chromium-containing alloy, or a molybdenum-containing alloy. In some embodiments, the current collector includes copper, stainless steel, and/or titanium;

Illustrative conductive carbon materials for the anode or cathode include, but are not limited to, synthetic graphite, natural graphite, expanded graphite, graphene, reduced graphene oxide, a metal-organic framework, amorphous carbon, hard carbon, soft carbon, carbon black, acetylene black, carbon spheres, mesocarbon microbeads (MCMB), mesoporous carbon, porous carbon matrix, carbon nanofiber, carbon aerogel, single-walled carbon nanotubes, multi-walled carbon nanotubes, carbon nanotube arrays, and any mixture of two or more thereof. In some embodiments, the conductive carbon materials include, microporous carbon, mesoporous carbon, mesoporous microbeads, graphite, expandable graphite, carbon black, or carbon nanotubes, or any combination thereof. Commercial examples of carbon black include, but are not limited to, Super P, Black Pearls® 2000, Denka Black, Vulcan XC72R, and Ketjen Black®.

When used, the binder may be present in the anode or cathode in an amount of from about 0.1 wt % to about 99 wt %. In some embodiments, the binder is present in the electrode in an amount of from about 5 wt % to about 20 wt %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatin, sodium alginate, polythiophene, polyacetylene, poly (9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), or a copolymer of any two or more such conductive polymers.

In the electrolyte, illustrative sodium salts include, but are not limited to, $Na[CF_3CO_2]$; $Na[C_2F_5CO_2]$; $NaClO_4$; $NaBF_4$; $NaAsF_6$; $NaPF_6$; $Na[PF_2(C_2O_4)_2]$; $Na[PF_4(C_2O_4)]$; $Na[CF_3SO_3]$; $Na[CH_3SO_3]$; $Na[N(SO_2F)_2]$; $Na[N(SO_2CF_3)_2]$; $Na[C(CF_3SO_2)_3]$; $Na[N(SO_2C_2F_5)_2]$; $NaSiF_6$; $NaSbF_6$; $NaAlCl_4$; $NaNO_3$; $NaOH$; $Na_2SO_4$; a sodium alkyl fluorophosphate; a sodium alkyl fluoroborate; sodium 4,5-dicyano-2-(trifluoromethyl)imidazole; sodium 4,5-dicyano-2-methylimidazole; trisodium 2,2',2"-tris(trifluoromethyl) benzotris(imidazolate); $Na[B(C_2O_4)_2]$; $Na[BF_2(C_2O_4)_2]$; $Na_2[(B_{12}X_{12-n}H_n)]$; $Na_2[(B_{10}X_{10-n'}H_{n'})]$; or a mixture of any two or more thereof, wherein X is independently at each occurrence a halogen, n is an integer from 0 to 12, and n' is an integer from 0 to 10. In some embodiments, the sodium salt includes $Na[CF_3SO_3]$; $Na[N(SO_2F)_2]$, $Na[N(SO_2CF_3)_2]$, or a mixture of any two or more thereof. The electrolyte may include the sodium salt at a concentration of about 0.1 M to about 5.0 M. In some embodiments, the sodium salt concentration is about 0.5 M to about 2.0 M.

In the electrolyte, illustrative solvents include dimethoxyethane (DME), diethylene glycol dimethyl ether (DEGDME), triethylene glycol dimethyl ether, tetraethylene glycol dimethyl ether (TEGDME), ethylene carbonate (EC), dimethylcarbonate (DMC), diethylcarbonate (DEC), propylene carbonate (PC), dioloxane, γ-butyrolactone, δ-butyrolactone, N-alkylpyrrolidone, fluoroethers (including perfluorinated ethers), fluoro esters (including perfluorinated esters), fluoroethylene carbonate, adiponitrile, (ethylene glycol)methylenetrimethyl silane (1NM1), di(ethylene glycol) methylenetrimethyl silane (1NM2), tri(ethylene glycol)m-ethylenetrimethyl silane (1NM3), acetonitrile (ACN), dimethyl sulfoxide (DMSO), dimethylformamide (DMF), siloxanes, triethyl phosphate, N,N-dimethylacetamide, N-methylpyrrolidone, methoxybenzene, ionic liquids, gel electrolytes, or a combination of any two or more thereof. In some embodiments, the solvent is an ether solvent. Illustrative ether solvents include, but are not limited to, dimethoxyethane (DME), diethylene glycol dimethyl ether (DEGDME), triethylene glycol dimethyl ether, and tetraethylene glycol dimethyl ether (TEGDME).

In some embodiments, the device includes a solid electrolyte. In some embodiments, solid electrolytes may be used as a separator. Illustrative solid electrolytes include solid electrolytes such as $Na_3PS_4$ inorganic solid electrolyte, β-Alumina electrolyte, NASICON based solid electrolyte of $NaMP_3O_{12}$, wherein M is a divalent cation, a trivalent cation, a tetravalent cation, or a pentavalent cation. For example, the divalent cation may be $Cd^{2+}$, $Mn^{2+}$, $Co^{2+}$, $Ni^{2+}$, or $Zn^{2+}$; the trivalent cation may be $Al^{3+}$, $Ga^{3+}$, or $Y^{3+}$; the tetravalent cation may be Tit $Si^{4+}$, or $Zr^{4+}$; and the pentavalent cation may be $V^{5+}$, $Nb^{5+}$, or $Sb^{5+}$.

The electrochemical devices described herein may be sodium-air secondary batteries, or used in other applications as appropriate.

In another aspect, a process of discharging a sodium-air battery is provided such that the primary discharge product is sodium peroxide dihydrate ($Na_2O_2 \cdot 2H_2O$), which is reversible to sodium and oxygen upon charging. The process includes discharging a sodium-air battery to form at least a partially discharged sodium battery including sodium peroxide dihydrate. The process may also include applying a potential to the at least partially discharged sodium battery to reverse the formation of sodium peroxide dihydrate to form sodium metal and oxygen ($O_2$). In some embodiments, discharge product is formed by the chemical reaction: $2Na + O_2 + 2H_2O \leftrightarrow Na_2O_2 \cdot 2H_2O$.

The sodium-air batteries of the process may include an air-cathode, an anode including sodium metal, a porous separator, and a non-aqueous electrolyte including a sodium salt and a solvent. In the devices, the porous separator includes a glass fiber material, polyethylene, polypropylene/ polyethylene/polypropylene, Nafion membrane, a solid electrolyte disclosed herein, or a combination of any two or more thereof. In some embodiments, the porous separator is a porous fiber separator and includes a glass fiber material, a carbon fiber material, or a combination of any two or more thereof.

The air-cathodes may, in some instances, include a catalyst to facilitate the kinetics of the electrolytic chemical reaction. For example, the catalyst may be based on Pt, Pd, Au, Ru, Ir, Ag, PtNi, PtAu, PtCu, PtRu, PtPd, $MnO_2$, NiO, $Co_3O_4$, $CeO_2$, $V_2O_5$, $Fe_2O_3$, ZnO, CuO, $NaMnO_2$, redox mediators, or a combination of any two or more thereof. In some embodiments, the catalyst includes Pt, Ni, or a mixture thereof. In some embodiments, the catalyst is $Pt_3Ni/C$.

In some embodiments, the air cathode may also include a current collector, a conductive carbon material, a binder, or any combination thereof.

The current collector for the anode or cathode may be prepared from a wide variety of electroactive materials. For example, illustrative current collectors include, but are not limited to; copper; stainless steel; titanium; tantalum; platinum; palladium; gold; silver; iron; aluminum; nickel; rhodium; manganese; vanadium; titanium; tungsten; cobalt nickel alloy; highly alloyed ferritic stainless steel containing molybdenum and chromium; or nickel-, chromium-, or molybdenum-containing alloys; or a carbon-coated metal described above. The current collector may take the form of a foil, mesh, or screen. In some embodiments, the electroactive material disclosed herein and one or more of an electroconductive carbon material and a binder are contacted with the current collector by casting, pressing, or rolling the mixture thereto. In some embodiments, the current collector is copper, stainless steel, titanium, tantalum, platinum, gold, aluminum, nickel, cobalt, cobalt nickel alloy, highly alloyed ferritic stainless steel containing molybdenum and chromium, a nickel-containing alloy, a chromium-containing alloy, or a molybdenum-containing alloy.

Illustrative conductive carbon materials for the anode or cathode include, but are not limited to, synthetic graphite, natural graphite, expanded graphite, graphene, reduced graphene oxide, a metal-organic framework, amorphous carbon, hard carbon, soft carbon, carbon black, acetylene black, carbon spheres, mesocarbon microbeads (MCMB), mesoporous carbon, porous carbon matrix, carbon nanofiber, carbon aerogel, single-walled carbon nanotubes, multi-walled carbon nanotubes, carbon nanotube arrays, and any mixture of two or more thereof. In some embodiments, the conductive carbon materials include, microporous carbon, mesoporous carbon, mesoporous microbeads, graphite, expandable graphite, carbon black, carbon nanotubes, or any combination thereof. Commercial examples of carbon black include, but are not limited to, Super P, Black Pearls® 2000, Denka Black, Vulcan XC72R, and Ketjen Black®.

When used, the binder for the anode or cathode may be present in an amount of from about 0.1 wt % to about 99 wt %. In some embodiments, the binder is present in the electrode in an amount of from about 5 wt % to about 20 wt %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers.

In the electrolyte, illustrative sodium salts include, but are not limited to, $Na[CF_3CO_2]$; $Na[C_2F_5CO_2]$; $NaClO_4$; $NaBF_4$; $NaAsF_6$; $NaPF_6$; $Na[PF_2(C_2O_4)_2]$; $Na[PF_4(C_2O_4)]$; $Na[CF_3SO_3]$; $Na[CH_3SO_3]$; $Na[N(SO_2F)_2]$; $Na[N(SO_2CF_3)_2]$; $Na[C(CF_3SO_2)_3]$; $Na[N(SO_2C_2F_5)_2]$; $NaSiF_6$; $NaSbF_6$; $NaAlCl_4$; $NaNO_3$; NaOH; $Na_2SO_4$; a sodium alkyl fluorophosphate; a sodium alkyl fluoroborate; sodium 4,5-dicyano-2-(trifluoromethyl)imidazole; sodium 4,5-dicyano-2-methylimidazole; trisodium 2,2',2''-tris(trifluoromethyl) benzotris(imidazolate); $Na[B(C_2O_4)_2]$; $Na[BF_2(C_2O_4)_2]$; $Na_2[(B_{12}X_{12-n}H_n)]$; $Na_2[(B_{10}X_{10-n'}H_{n'})]$; or a mixture of any two or more thereof, wherein X is independently at each occurrence a halogen, n, is an integer from 0 to 12 and n' is an integer from 0 to 10. In some embodiments, the sodium salt includes $Na[CF_3SO_3]$; $Na[N(SO_2F)_2]$, $Na[N(SO_2CF_3)_2]$, or a mixture of any two or more thereof. In some embodiments, the electrolyte includes a sodium salt at a concentration of about 0.1 M to about 5.0 M. In one embodiment, the sodium salt concentration is about 0.5 M to about 2.0 M.

In the electrolyte, illustrative solvents include dimethoxyethane (DME), diethylene glycol dimethyl ether (DEGDME), triethylene glycol dimethyl ether, tetraethylene glycol dimethyl ether (TEGDME), ethylene carbonate (EC), dimethylcarbonate (DMC), diethylcarbonate (DEC), propylene carbonate (PC), dioloxane, γ-butyrolactone, δ-butyrolactone, N-alkylpyrrolidone, fluoroethers (including perfluorinated ethers), fluoroesters (including perfluorinated esters), fluoroethylene carbonate, adiponitrile, (ethylene glycol)methylenetrimethyl silane (1NM1), di(ethylene glycol) methylenetrimethyl silane (1NM2), tri(ethylene glycol)methylenetrimethyl silane (1NM3), acetonitrile (ACN), dimethyl sulfoxide (DMSO), dimethylformamide (DMF), siloxanes, triethyl phosphate, N,N-dimethylacetamide, N-methylpyrrolidone, methoxybenzene, ionic liquids, gel electrolytes, or a combination of any two or more thereof. In some embodiments, the solvent is an ether solvent. Illustrative ether solvents include, but are not limited to, dimethoxyethane (DME), diethylene glycol dimethyl ether (DEGDME), triethylene glycol dimethyl ether, and tetraethylene glycol dimethyl ether (TEGDME).

The electrochemical devices described in the process herein may include sodium-air secondary batteries, or other electrochemical devices as appropriate.

The present invention, thus generally described, will be understood more readily by reference to the following examples, which are provided by way of illustration and are not intended to be limiting of the present invention.

EXAMPLES

Example 1

Figure 3A:
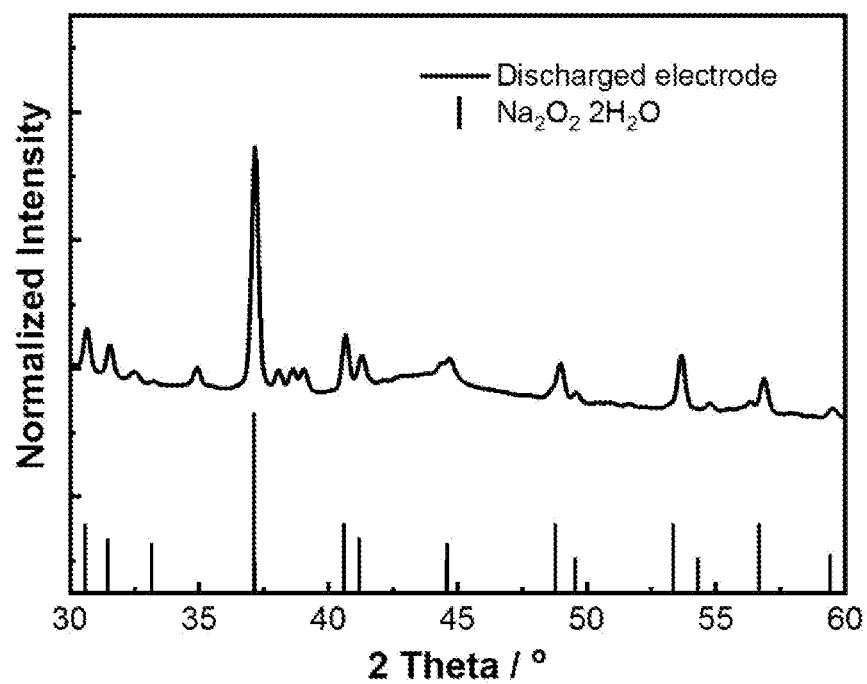
FIGS. 3A and 3B are x-ray diffraction patterns of discharged air electrode from a sodium-air battery both without a catalyst (FIG. 3A) and with a PtNi/C catalyst (FIG. 3B), according to the examples.
Figure 6:
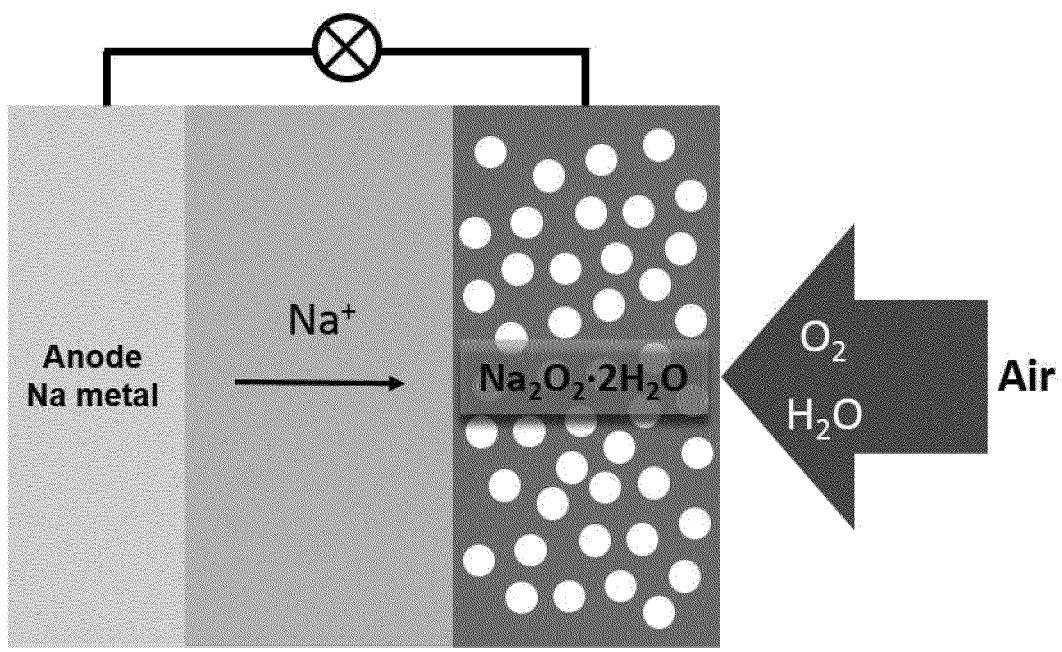
FIG. 6 is a schematic illustration of a sodium-air battery including an air electrode, according to various embodiments described herein.

Assembly and discharge of sodium-air battery (without catalyst). A sodium metal slice (Fisher Scientific, labgrade) was used as the metal anode and the diameter of the sodium anode is around ½" with a thickness of 500 μm. H23 carbon paper (Freudenberg) was used as a substrate in the air electrode. The electrolyte was diethylene glycol dimethyl ether (DEGDME, Sigma-Aldrich, 99.5%) containing 1 M sodium trifluoromethanesulfonate (sodium triflate, Sigma-Aldrich, 98%). Two pieces of glass fiber paper (Whatman®, 300 um thickness) were used as the separator. The sodium-air cell was assembled by stacking the sodium metal on a stainless steel rod (current collector), the separator was soaked with the electrolyte, the cathode, and stainless steel mesh (current collector). A stainless steel cell was used as the cell setup. The housing contained air access ports so that the cell was open to air during electrochemical measurements. The cell configuration is shown in FIG. 6. A specific current of 100 mA g$^{-1}$ was applied to the cell, and the discharge was based on a limited specific capacity of 500 mAh·g$^{-1}$ with a five-hour discharge/charge period. FIG. 1 (without catalyst) shows the voltage profiles of sodium-air batteries, in which the discharge voltage is around 2.2 V. The charging process has 3 plateaus, wherein the third plateau is over 4 V. The discharge product was observed to be $Na_2O_2.2H_2O$. FIG. 3A shows the x-ray diffraction pattern of the discharged electrode and the standard signals of $Na_2O_2.2H_2O$. The signals of discharged electrode match well with the standard signals, proving the formation of $Na_2O_2.2H_2O$ during discharge.

Figure 4:
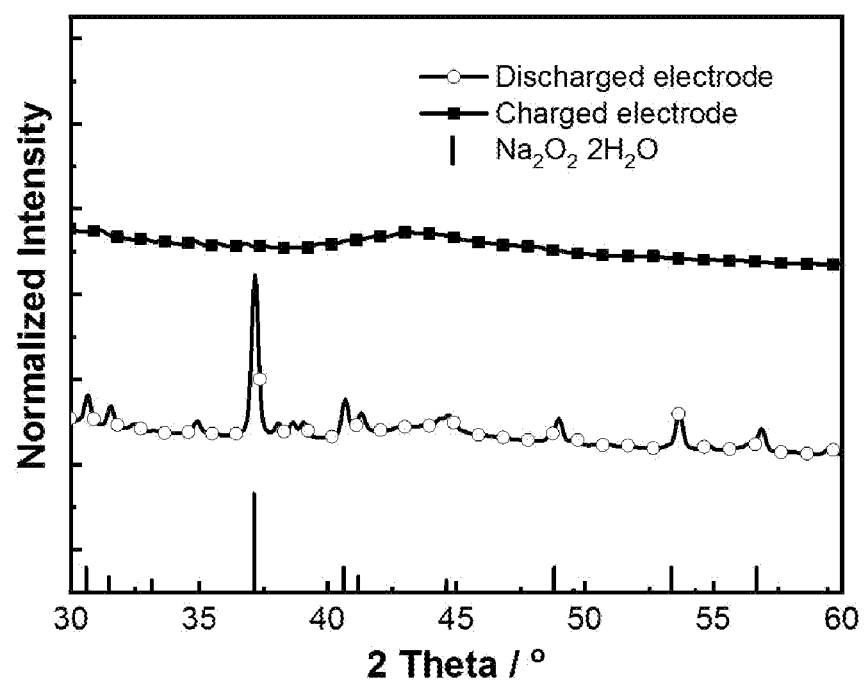
FIG. 4 contains x-ray diffraction patterns for the standard diffractions of $Na_2O_2 \cdot 2H_2O$, a discharged cathode, and a charged cathode (bottom to top), and illustrates the rechargeability of the discharge product, $Na_2O_2 \cdot 2H_2O$, according to the examples.

The reversible formation of the $Na_2O_2.2H_2O$ in the cell is illustrated in FIG. 4 which shows x-ray diffraction (XRD) patterns for the standard diffractions of $Na_2O_2.2H_2O$, a discharged cathode, and a charged cathode (bottom to top). The discharged cathode also shows the signals of the standard $Na_2O_2.2H_2O$, confirming $Na_2O_2.2H_2O$ as the discharge product. When the cell is recharged, the charged cathode shows no signals of $Na_2O_2.2H_2O$, confirming that $Na_2O_2.2H_2O$ is removed from the electrode upon charging. The XRD results prove the reversibility of $Na_2O_2.2H_2O$ in the sodium-air battery.

FIGS. 5A, 5B, 5C, and 5D are different magnifications scanning electron microscope (SEM) images of a discharged air electrode from a sodium-air battery without a catalyst. The carbon fibers have a size around 10 μm creating large pores for airflow. The morphology of the discharge product shows a spherical structure. The particles have a diameter around 2 μm and deposit on the surface of the carbon fibers. The carbon fibers have a size around 10 μm creating large pores for airflow. The morphology of the discharge product shows a spherical structure. The particles have a diameter around 2 μm and deposit on the surface of the carbon fibers.

Example 2

Figure 2A:
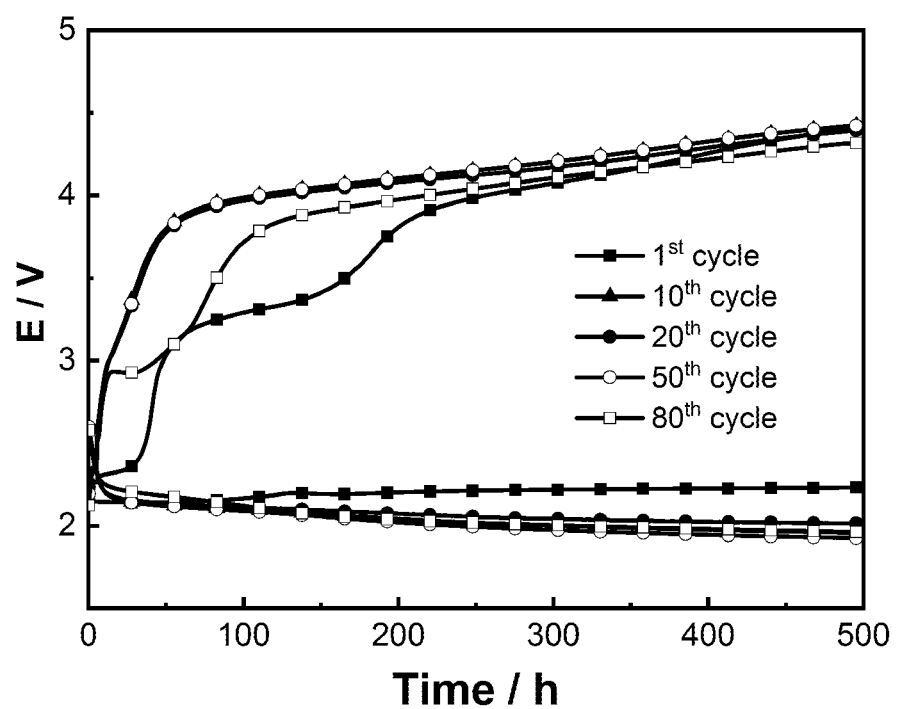
FIGS. 2A and 2B are voltage profiles for sodium-air batteries without a catalyst for 80 cycles (FIG. 2A) and with a PtNi/C catalyst for 100 cycles (FIG. 2B), according to the examples.
Figure 2B:
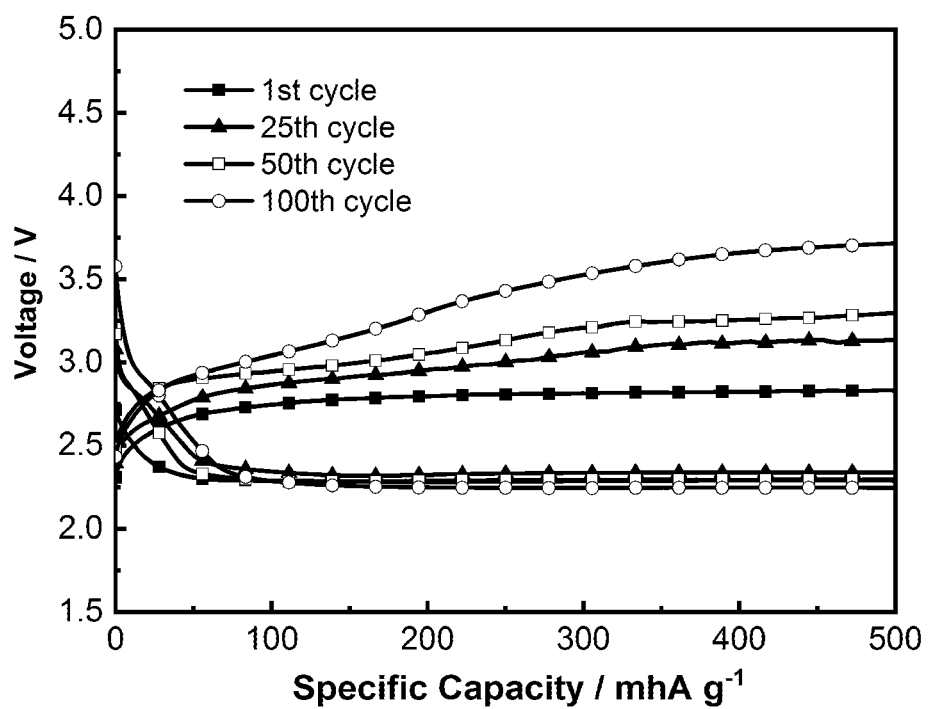
Figure 3B:
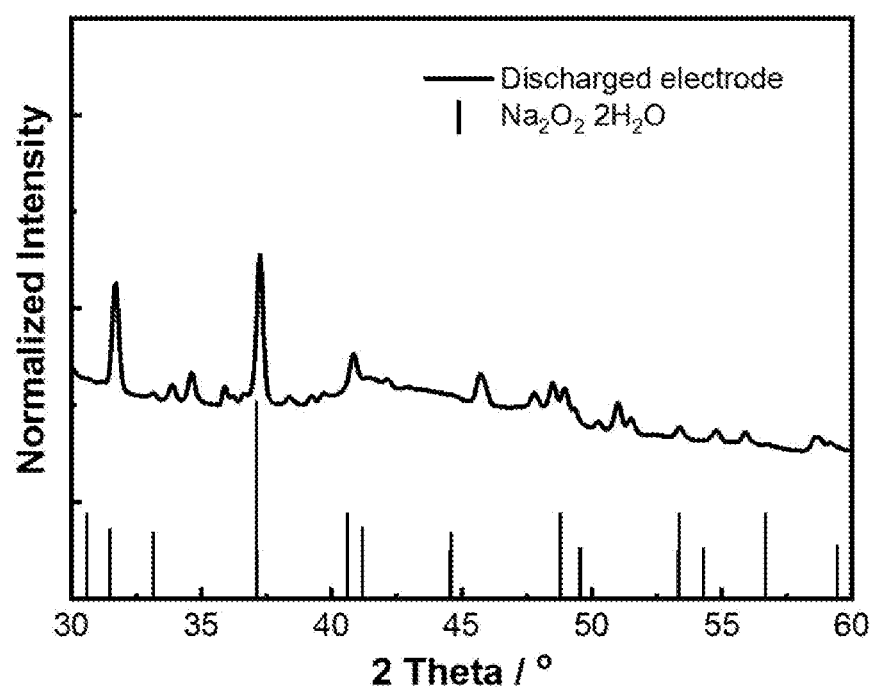

Assembly and discharge of sodium-air battery (with PtNi catalyst). A cell with a size of half an inch was assembled with stainless steel housing and having a sodium metal anode, a glass fiber separator, a cathode and an electrolyte of 1 M sodium trifluoromethansulfonate in DEGDME. The cathode is carbon fiber paper loaded with PtNi alloy nanoparticle catalyst. A slurry made by mixing PtNi alloy nanoparticles, active carbon powders, polytetrafluoroethylene (PTFE) binder, and distilled water was pasted on the H23 carbon fiber paper. The prepared cathode was then dried in a vacuum oven at 100° C. for 12 hours. The housing contained air access ports so that the cell was open to air during electrochemical measurements. A specific current of 100 mA g$^{-1}$ was applied to the cell, and the discharge was based on a limited specific capacity of 500 mAh·g$^{-1}$ with a five hour discharge/charge period. In this cell, it was observed that the charge overpotential was substantially reduced, and the cell exhibited high stability over cycling, high energy efficiency, and long cycle life. FIG. 1 shows the voltage profile of sodium-air batteries without catalyst and with PtNi/C catalyst. Compared to the cell without catalyst, the cell with a PtNi/C catalyst shows much smaller charging voltages, resulting in a higher energy density. FIGS. 2A and 2B are illustrations of the voltage profiles for sodium-air cells without a catalyst for 80 cycles (FIG. 2A) and with a PtNi/C catalyst containing air cathode with 100 cycles (FIG. 2B). FIG. 3B confirms the discharge product in the cell with the PtNi/C catalyst is $Na_2O_2.2H_2O$.

Example 3

Discharge of sodium-air battery with Pt catalyst. A sodium-air battery was assembled according to Example 1, with the exception that the cathode included a Pt nanoparticle catalyst. A slurry was made by mixing Pt nanoparticles, active carbon powders, polytetrafluoroethylene (PTFE) binder, and distilled water was pasted onto H23 carbon fiber paper. The prepared cathode was then dried in a vacuum oven at 100° C. for 12 hours. The battery was tested with a similar method to that of Example 1. In this cell, it was observed that the charge overpotential was substantially reduced, and the cell exhibited high stability over cycling, high energy efficiency, and long cycle life. FIG. 1 shows the voltage profiles of the sodium-air batteries without catalyst, with PtNi/C catalyst, and with Pt/C catalyst. Compared to the cell without catalyst, the cells with PtNi/C and Pt/C catalyst show much smaller charging voltages, resulting in higher energy densities.

Example 4

Sodium-air battery with solid electrolyte. A cell with a size of half an inch was assembled with a stainless steel housing and having a sodium metal anode, β-alumina solid electrolyte, and a cathode with H23 carbon fiber paper. Before cell assembly, the β-alumina solid electrolyte was immersed in a liquid electrolyte of 1 M sodium trifluoromethansulfonate in DEGDME for 48 hours. The β-alumina solid electrolyte then transferred into the battery and worked as both the separator and electrolyte. A specific current of 100 mA g$^{-1}$ was applied to the cell, and the discharge was based on a limited specific capacity of 500 mAh·g$^{-1}$ with a five hour discharge/charge period.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrochemical device comprising:
    an air cathode comprising air and a catalyst comprising Pt, Pd, Au, Ru, Ir, Ag, PtNi, PtAu, PtCu, PtRu, PtPd, $MnO_2$, NiO, $Co_3O_4$, $CeO_2$, $V_2O_5$, $Fe_2O_3$, ZnO, CuO, $NaMnO_2$, or a combination of any two or more thereof;
    an anode comprising a metal;
    a discharge product comprising sodium peroxide dihydrate ($Na_2O_2 \cdot 2H_2O$) and $NaOH \cdot H_2O_2$;
    a porous separator; and
    a non-aqueous electrolyte comprising a sodium salt and a solvent.

2. The electrochemical device of claim 1, wherein the air cathode comprises an air cathode layer comprising an electroconductive material and the air.

3. The electrochemical device of claim 1, wherein the air comprises $N_2$, $O_2$, $CO_2$, and water.

4. The electrochemical device of claim 2, wherein the electroconductive material comprises a porous carbon material selected from one or more of synthetic graphite, natural graphite, expanded graphite, graphene, reduced graphene oxide, a metal-organic framework, amorphous carbon, hard carbon, soft carbon, carbon black, acetylene black, carbon spheres, mesocarbon microbeads (MCMB), mesoporous carbon, porous carbon matrix, carbon nanofiber, carbon aerogel, single-walled carbon nanotubes, multi-walled carbon nanotubes, and carbon nanotube arrays.

5. The electrochemical device of claim 1, wherein the electrochemical device comprises a sodium-air secondary battery.

6. The electrochemical device of claim 1, wherein the air cathode further comprises a current collector, a conductive carbon material, a binder, or any combination thereof.

7. The electrochemical device of claim 1, wherein the anode comprises one or more of sodium, sodiated carbon, sodiated tin, sodiated silicon, sodiated antimony, sodium lithium alloy, and sodium titanium oxide.

8. The electrochemical device of claim 1, wherein the sodium salt comprises $Na[CF_3CO_2]$; $Na[C_2F_5CO_2]$; $NaClO_4$; $NaBF_4$; $NaAsF_6$; $NaPF_6$; $Na[PF_2(C_2O_4)_2]$; $Na[PF_4(C_2O_4)]$; $Na[CF_3SO_3]$; $Na[CH_3SO_3]$; $Na[N(SO_2F)_2]$; $Na[N(SO_2CF_3)_2]$; $Na[C(CF_3SO_2)_3]$; $Na[N(SO_2C_2F_5)_2]$; $NaSiF_6$; $NaSbF_6$; $NaAlCl_4$; $NaNO_3$; $Na_2SO_4$; a sodium alkyl fluorophosphate; a sodium alkyl fluoroborate; sodium 4,5-dicyano-2-(trifluoromethyl)imidazole; sodium 4,5-dicyano-2-methylimidazole; trisodium 2,2',2"-tris(trifluoromethyl)benzotris (imidazolate); $Na[B(C_2O_4)_2]$; $Na[BF_2(C_2O_4)_2]$; $Na_2[(B_{12}X_{12-n}H_n)]$; $Na_2[(B_{10}X_{10-n'}H_{n'})]$; or a mixture of any two or more thereof, wherein X is independently at each occurrence a halogen, n, is an integer from 0 to 12 and n' is an integer from 0 to 10.

9. The electrochemical device of claim 1, wherein the sodium salt is present in the electrolyte at a concentration of about 0.1 M to about 5.0 M.

10. The electrochemical device of claim 1, wherein the solvent comprises dimethoxyethane (DME), diethylene glycol dimethyl ether (DEGDME), triethylene glycol dimethyl ether, tetraethylene glycol dimethyl ether (TEGDME), solid electrolytes such as $Na_3PS_4$ inorganic solid electrolyte, β-Alumina electrolyte, NASICON based solid electrolyte of $NaMP_3O_{12}$, gel electrolytes, polyethylene oxide (PEO), polyacrylonitride (PAN), polymethylmethacrylate (PMMA), and combinations thereof; wherein M is a divalent cation, a trivalent cation, a tetravalent cation, or a pentavalent cation.

11. The electrochemical device of claim 1, wherein the solvent comprises dimethoxyethane (DME), diethylene glycol dimethyl ether (DEGDME), triethylene glycol dimethyl ether, tetraethylene glycol dimethyl ether (TEGDME), or a combination of any two or more thereof.

12. The electrochemical device of claim 1, wherein the electrochemical device is a sodium-air secondary battery.

13. The electrochemical device of claim 1, wherein the porous separator comprises a glass fiber material, a carbon fiber material, polyethylene, polypropylene/polyethylene/polypropylene, solid state membranes, or a combination of any two or more thereof.

14. A process of discharging a sodium-air battery, the process comprising discharging a sodium-air battery to form a discharged sodium-air battery comprising:
    an air cathode comprising a catalyst comprising Pt, Pd, Au, Ru, Ir, Ag, PtNi, PtAu, PtCu, PtRu, PtPd, $MnO_2$, NiO, $Co_3O_4$, $CeO_2$, $V_2O_5$, $Fe_2O_3$, ZnO, CuO, $NaMnO_2$, or a combination of any two or more thereof; and
    a discharge product of sodium peroxide dihydrate ($Na_2O_2 \cdot 2H_2O$) and $NaOH \cdot H_2O_2$.

15. The process of claim 14, wherein the discharging is conducted under an air atmosphere comprising $N_2$, $O_2$, $CO_2$, and water.

16. The process of claim 14, further comprising applying a potential to the discharged sodium-air battery to reverse the formation of sodium peroxide dihydrate and $NaOH \cdot H_2O_2$.

17. The process of claim 14, wherein the sodium-air battery is discharged to about 2.4 V to about 1.6V.

\* \* \* \* \*